United States Patent
Yamamoto (10) Patent No.: US 12,325,372 B2
(45) Date of Patent: Jun. 10, 2025

(54) COLLISION DETECTION APPARATUS

(71) Applicant: SUBARU CORPORATION, Tokyo (JP)

(72) Inventor: Kentaro Yamamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 302 days.

(21) Appl. No.: 17/934,223

(22) Filed: Sep. 22, 2022

(65) Prior Publication Data

US 2023/0096952 A1    Mar. 30, 2023

(30) Foreign Application Priority Data

Sep. 30, 2021   (JP) .................. 2021-161018

(51) Int. Cl.
  *B60R 19/18*    (2006.01)
  *B60R 19/48*    (2006.01)
  *G01L 1/02*     (2006.01)
  *G01L 5/00*     (2006.01)

(52) U.S. Cl.
  CPC ............ *B60R 19/483* (2013.01); *B60R 19/18* (2013.01); *G01L 1/02* (2013.01); *G01L 5/0052* (2013.01); *B60R 2019/186* (2013.01); *B60R 2019/1886* (2013.01)

(58) Field of Classification Search
  CPC .............. B60R 19/483; B60R 19/18; B60R 2019/1886; B60R 2019/186; G01L 1/02; G01L 5/0052
  See application file for complete search history.

(56) References Cited

U.S. PATENT DOCUMENTS

2018/0141515 A1*  5/2018  Feeser .................. B60R 21/34
2020/0223384 A1*  7/2020  Kim .................... B60R 19/483

FOREIGN PATENT DOCUMENTS

JP    2016022940 A  *  2/2016  ............ B60R 19/12
JP    2016-155411 A     9/2016

* cited by examiner

*Primary Examiner* — Daniel J Colilla
(74) *Attorney, Agent, or Firm* — TROUTMAN PEPPER LOCKE LLP (57) ABSTRACT

A collision detection apparatus includes a bumper beam, an absorber, a collision detection sensor, and a bumper cover. The bumper beam extends in a vehicle width direction. The absorber is disposed adjacent to a vehicle front side of the bumper beam. The collision detection sensor includes a pressure tube extending in the vehicle width direction and held by the absorber and is configured to output a signal corresponding to a pressure change in the pressure tube. The bumper cover is disposed on a vehicle front side of the absorber. The bumper cover includes: a low rigidity part disposed at a position lower than the pressure tube; and a high rigidity part having a bending rigidity higher than a bending rigidity of the low rigidity part, disposed at a position above the low rigidity part, and having an upper end at a position higher than the pressure tube.

18 Claims, 4 Drawing Sheets

COLLISION DETECTION APPARATUS

CROSS-REFERENCE TO RELATED APPLICATION

The present application claims priority from Japanese Patent Application No. 2021-161018 filed on Sep. 30, 2021, the entire contents of which are hereby incorporated by reference.

BACKGROUND

The disclosure relates to a collision detection apparatus. Japanese Unexamined Patent Application Publication No. 2016-155411 describes a vehicular collision detection apparatus in which a bumper absorber is disposed on a vehicle rear side of a bumper cover and adjacent to a vehicle front side of a bumper reinforcement. Additionally, the bumper absorber has a groove in which a pressure tube is held. The bumper absorber further has a lower recession at a rear end thereof and on a vehicle lower side of the groove. The lower recession is open on the vehicle lower side. This can increase a force per unit area of a collision load to be applied to the pressure tube at the time of a collision of a collision object with the bumper cover.

SUMMARY

One or more embodiments of the disclosure provide a collision detection apparatus. The collision detection apparatus includes a bumper beam, an absorber, a collision detection sensor, and a bumper cover. The bumper beam extends in a vehicle width direction. The absorber is disposed adjacent to a vehicle front side of the bumper beam. The collision detection sensor includes a pressure tube that extends in the vehicle width direction and is held by the absorber. The collision detection sensor is configured to output a signal corresponding to a pressure change in the pressure tube. The bumper cover is disposed on a vehicle front side of the absorber. The bumper cover includes: a low rigidity part disposed at a position lower than the pressure tube; and a high rigidity part that has a bending rigidity higher than a bending rigidity of the low rigidity part, is disposed at a position above the low rigidity part, and has an upper end at a position higher than the pressure tube.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

The vehicular collision detection apparatus is designed without consideration of a difference between a deformation amount of the bumper cover upon collision with a pedestrian and a deformation amount of the bumper cover upon collision with a collision object other than a pedestrian, for example, a road obstacle such as a roadside marker or a post cone. Thus, even in the collision of the object other than a pedestrian with the bumper cover, the bumper cover may be deformed to the vehicle rear side, and a deformation amount of the pressure tube may become relatively large. In this case, the vehicular collision detection apparatus may fail to adequately determine whether a collision object colliding with a vehicle is a pedestrian.

It is desirable to provide a collision detection apparatus capable of adequately determining a collision object colliding with a vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A collision detection apparatus 10 according to the present embodiment will be described below with reference to the drawings. Note that, arrow FR, arrow UP, and arrow LH, which are illustrated as appropriate in the drawings, indicate a vehicle front side, a vehicle upper side, and a vehicle left side (one side in a vehicle width direction), respectively, of a vehicle (automobile) V to which the collision detection apparatus 10 is applied. In the following description, unless otherwise specified, an up-down direction, a front-rear direction, and a left-right direction refer to a vehicle up-down direction, a vehicle front-rear direction, and a vehicle left-right direction, respectively.

Figure 1:
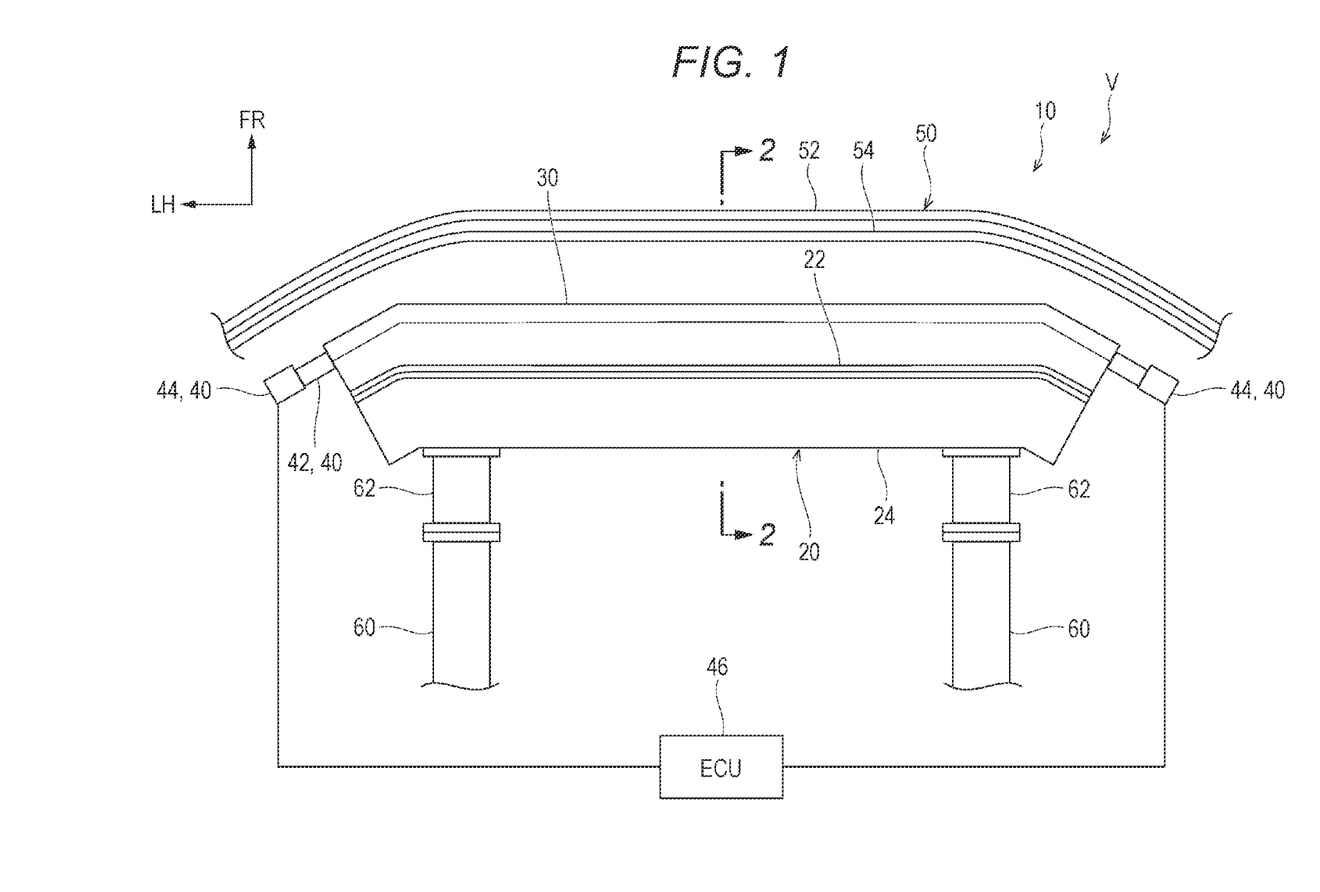
FIG. 1 is a schematic plan view illustrating a collision detection apparatus according to the present embodiment.
Figure 2:
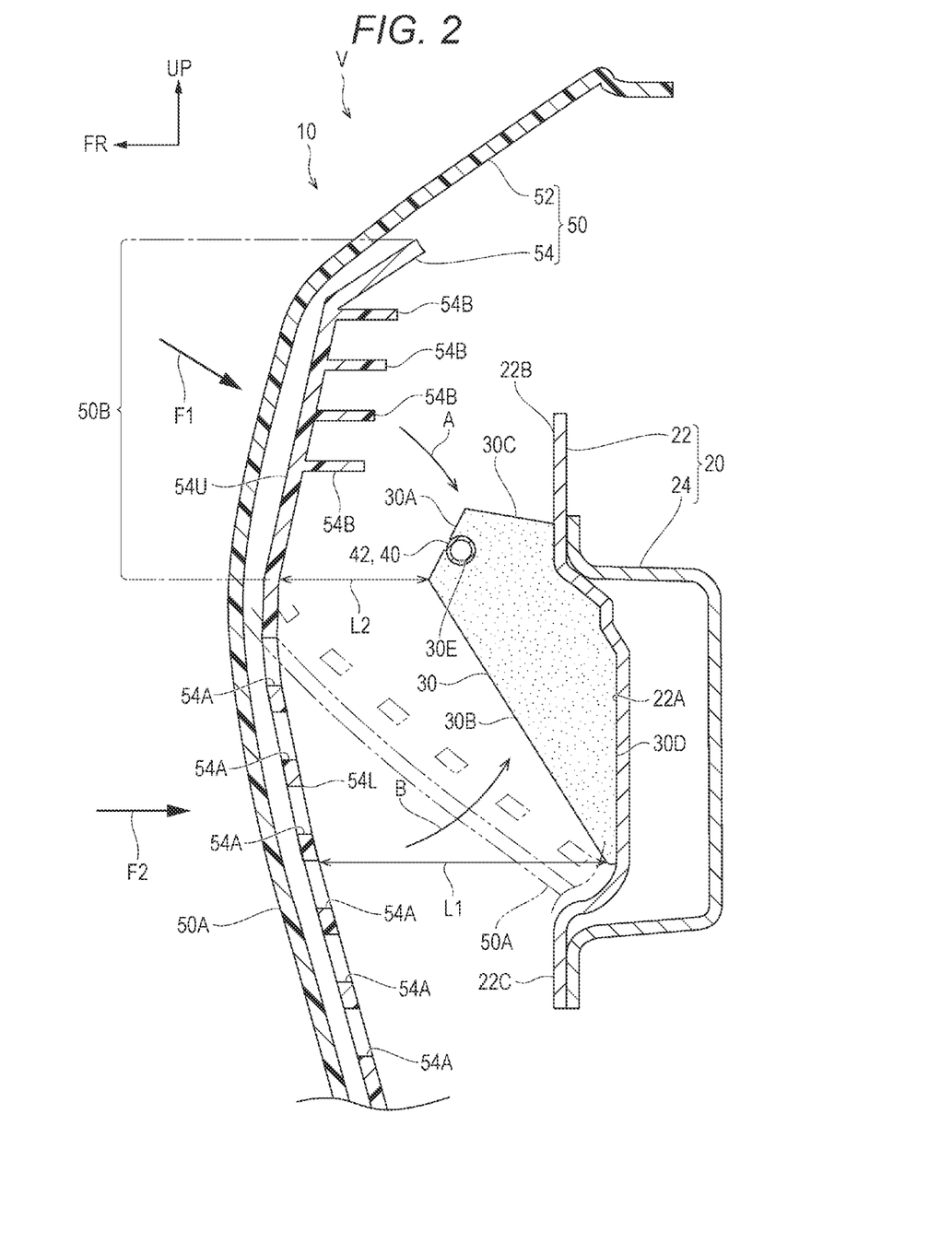
FIG. 2 is a sectional view (an enlarged sectional view taken along line 2-2 in FIG. 1) of the collision detection apparatus illustrated in FIG. 1 when viewed from a left side.

As illustrated in FIGS. 1 and 2, the collision detection apparatus 10 is disposed at a front end area of the vehicle V and configured to detect (presence or absence of) a collision of a collision object with the vehicle V. The collision detection apparatus 10 includes a bumper beam 20, a bumper cover 50, and an absorber 30. The bumper beam 20 constitutes a framework member of the vehicle V. The bumper cover 50 is disposed at a front end of the vehicle V. The absorber 30 is disposed between the bumper cover 50 and the bumper beam 20. The collision detection apparatus 10 further includes a collision detection sensor 40. Each component of the collision detection apparatus 10 will be described below.

The bumper beam 20 extends in the left-right direction (vehicle width direction). The bumper beam 20 has a substantially rectangular closed cross-sectional shape as seen in a sectional view when viewed in a longitudinal direction of the bumper beam 20. The bumper beam 20 includes a front panel 22 and a rear panel 24. The front panel 22 constitutes a front end side of the bumper beam 20. The rear panel 24 constitutes a rear side of the bumper beam 20.

The front panel 22 is made of a metal plate, has a plate thickness direction corresponding to the front-rear direction, and extends in the left-right direction. Additionally, the front panel 22 has, in its intermediate area in the up-down direction, a recess 22A that is open forward. Moreover, the front panel 22 includes an upper flange 22B located above the recess 22A and a lower flange 22C located below the recess 22A.

Similarly to the front panel 22, the rear panel 24 is made of a metal plate and extends in the left-right direction. The rear panel 24 has a forward open, substantially gutter shape when viewed in a longitudinal direction of the rear panel 24. Moreover, the rear panel 24 has an upper end joined to the upper flange 22B of the front panel 22, and a lower end joined to the lower flange 22C of the front panel 22.

A pair of left and right front side members 60 are disposed behind the bumper beam 20. The front side members 60 constitute a framework of the vehicle V and extend in the front-rear direction. Moreover, both ends of the bumper beam 20 in the vehicle width direction are coupled respectively to front ends of the front side members 60 with crash boxes 62 interposed between the bumper beam 20 and the front side members 60.

The absorber 30 is made of a foamed resin material, such as urethane foam. The absorber 30 has a substantially elongated shape whose longitudinal direction corresponds to the left-right direction, and is disposed adjacent to the front side of the bumper beam 20. The absorber 30 has a substantially trapezoidal shape as seen in a sectional view when viewed in the longitudinal direction of the absorber 30. In one example, the absorber 30 includes an upper inclined surface 30A as an upper end part of a front surface of the absorber 30. The upper inclined surface 30A is gradually inclined rearward in an upward direction as seen in a side sectional view. On the other hand, the absorber 30 includes a lower inclined surface 30B as an inclined surface at a lower part of the front surface of the absorber 30. The lower inclined surface 30B extends rearward and obliquely downward from a lower end of the upper inclined surface 30A. Thus, the absorber 30 has a front end constituted by an upper end of the lower inclined surface 30B. Additionally, the lower inclined surface 30B has an up-down dimension significantly greater than an up-down dimension of the upper inclined surface 30A.

Furthermore, the absorber 30 includes an upper surface 30C extending rearward and obliquely downward from an upper end of the upper inclined surface 30A. The absorber 30 includes a rear surface 30D coupling a rear end of the lower inclined surface 30B to a rear end of the upper surface 30C. Moreover, the absorber 30 is disposed adjacent to the front sides of the recess 22A and upper flange 22B of the front panel 22 of the bumper beam 20. The rear surface 30D of the absorber 30 is fixed to a front surface of the bumper beam 20. Here, the rear surface 30D of the absorber 30 is shaped in conformance with the front surface of the bumper beam 20. That is, the rear surface 30D of the absorber 30 is shaped to protrude rearward at a lower part thereof as seen in a side sectional view when viewed in the left-right direction. Moreover, the absorber 30 is disposed at a position lower than an upper end of the front panel 22 of the bumper beam 20. The upper flange 22B of the bumper beam 20 is exposed forward at an upper part thereof.

The upper inclined surface 30A of the absorber 30 has a holding groove 30E in which a pressure tube 42 to be described later is held. The holding groove 30E has a substantially C shape that is open obliquely upward to the front as seen in a side sectional view, and is formed over the entire length in the longitudinal direction of the absorber 30.

The collision detection sensor 40 includes the pressure tube 42 held by the absorber 30, and pressure sensors 44 each configured to output a signal corresponding to a pressure change in the pressure tube 42. Each of the pressure sensors 44 is an element grasped as a pressure detector in a broad sense.

The pressure tube 42 has an elongated shape whose longitudinal direction corresponds to the left-right direction, and is a hollow structure of a substantially annular cross-section. Additionally, the pressure tube 42 has an outer diameter slightly smaller than an inner diameter of the holding groove 30E of the absorber 30, and is fitted into the holding groove 30E. Thus, the pressure tube 42 is held at the front end of the absorber 30.

The pressure sensors 44 are provided at longitudinal ends of the pressure tube 42 and are fixed to a vehicle body at unillustrated positions. The pressure sensors 44 are electrically coupled to an electronic control unit (ECU) 46. The ECU 46 is an element grasped as a collision determiner in a broad sense. In response to deformation of the pressure tube 42, the pressure sensors 44 each output, to the ECU 46, a signal corresponding to a pressure change in the pressure tube 42.

Additionally, the ECU 46 is electrically coupled to a collision speed sensor (not illustrated). The collision speed sensor outputs, to the ECU 46, a signal corresponding to a collision speed of collision between a collision object and the bumper cover 50 to be described later. Then, the ECU 46 calculates a collision load based on the signal output from one or each of the pressure sensors 44 and calculates the collision speed based on the signal output from the collision speed sensor. Furthermore, the ECU 46 obtains effective mass of the collision object from the calculated collision load and collision speed, determines whether the effective mass exceeds a threshold, and determines whether the collision object colliding with the bumper cover 50 is a pedestrian or an object other than a pedestrian, for example, a road obstacle such as a roadside marker or a post cone.

The bumper cover 50 is disposed in front of the absorber 30 and constitutes the front end of the vehicle V. The bumper cover 50 includes an outer cover 52 and an inner cover 54. The outer cover 52 constitutes a design surface of the vehicle. The inner cover 54 is disposed behind the outer cover 52 and overlaps the outer cover 52 in the front-rear direction. That is, the bumper cover 50 has a double cover structure. Additionally, the bumper cover 50 is curved such that an intermediate area of the bumper cover 50 in the up-down direction protrudes forward as seen in a side sectional view. A front-rear length L1 between the lower end of the lower inclined surface 30B of the absorber 30 and the bumper cover 50 is made longer than a front-rear length L2 between the upper end of the lower inclined surface 30B of the absorber 30 and the bumper cover 50.

The outer cover 52 is made of a resin material, for example. The outer cover 52 is located forward of the absorber 30 and extends in the vehicle width direction. The outer cover 52 has an upper end at a position higher than the bumper beam 20, and a lower end at a position lower than the bumper beam 20. The outer cover 52 is fixedly supported with respect to the vehicle body at an unillustrated position.

Similarly to the outer cover 52, the inner cover 54 is made of a resin material, for example. The inner cover 54 is disposed adjacent to the rear side of the outer cover 52, and is fixed to the outer cover 52 at an unillustrated position.

Thus, the inner cover 54 is integrated with the outer cover 52. Note that, FIG. 2 exaggeratedly illustrates a gap between the outer cover 52 and the inner cover 54. The inner cover 54 has an upper end at a position higher than the bumper beam 20 and at a position lower than the upper end of the outer cover 52. The inner cover 54 has a lower end at a position lower than the bumper beam 20.

The inner cover 54 includes a lower cover part 54L as a lower part thereof. The lower cover part 54L is disposed at a position lower than the pressure tube 42. In one example, the lower cover part 54L is disposed in front of the lower inclined surface 30B of the absorber 30. The lower cover part 54L has holes 54A penetrating therethrough. In the lower cover part 54L, as an example, the holes 54A are aligned in the up-down direction to form a single row, and rows of the holes 54A are aligned at predetermined intervals in the vehicle width direction.

The inner cover 54 includes an upper cover part 54U as an upper part thereof. The upper cover part 54U is disposed at a position above the lower cover part 54L. In one example, the upper cover part 54U includes a lower part disposed in front of the upper inclined surface 30A of the absorber 30, and an upper part at a position higher than the absorber 30. Thus, the upper cover part 54U and the pressure tube 42 are disposed to overlap each other as seen in a front view when viewed from the front side. The upper cover part 54U has an upper end at a position higher than the pressure tube 42.

The bumper cover 50 includes a low rigidity part 50A and a high rigidity part 50B. The low rigidity part 50A is in an area where the lower cover part 54L and the outer cover 52 overlap in the front-rear direction. The high rigidity part 50B is in an area where the upper cover part 54U and the outer cover 52 overlap in the front-rear direction. As described above, the lower cover part 54L has the holes 54A. Therefore, in the bumper cover 50, the high rigidity part 50B has a bending rigidity higher than that of the low rigidity part 50A.

The upper cover part 54U of the inner cover 54 includes, at its upper part, a plurality of (in the present embodiment, four) reinforcement ribs 54B. In one embodiment, the reinforcement ribs 54B may serve as "reinforcements". The reinforcement ribs 54B are arranged side by side at predetermined intervals in the up-down direction. Each of the reinforcement ribs 54B protrudes rearward from the upper cover part 54U, has a substantially plate shape whose plate thickness direction corresponds to the up-down direction, and extends in the vehicle width direction. Thus, the bending rigidity of an upper part of the high rigidity part 50B is higher than that of a lower part of the high rigidity part 50B. The reinforcement ribs 54B are disposed at a position higher than the absorber 30.

Operation and effects of the present embodiment will now be described.

In the collision detection apparatus 10 configured as described above, the bumper cover 50 includes the low rigidity part 50A and the high rigidity part 50B having the bending rigidity higher than that of the low rigidity part 50A. The high rigidity part 50B is disposed at a position above the low rigidity part 50A. Then, in the collision between the bumper cover 50 and the collision object, as described above, the ECU 46 obtains the effective mass of the collision object and determines whether the collision object colliding with the bumper cover 50 is a pedestrian or an object other than a pedestrian.

Here, in order for the collision detection apparatus 10 to adequately determine a collision object colliding with the vehicle V, it is desirable to adequately deform the pressure tube 42 upon collision between the pedestrian and the bumper cover 50 and to reduce the deformation amount of the pressure tube 42 upon collision between a collision object other than a pedestrian and the bumper cover 50.

In the collision between the pedestrian and the bumper cover 50, the leg of the pedestrian hits the high rigidity part 50B that is the upper part of the bumper cover 50, and the pedestrian falls down on a hood of the vehicle V. For this reason, mainly, a collision load F1 (see FIG. 2) acting rearward and obliquely downward is applied to the high rigidity part 50B. When receiving the collision load F1, the high rigidity part 50B deforms rearward and obliquely downward (in a direction of arrow A in FIG. 2) and presses the absorber 30 and the pressure tube 42. Thus, the absorber 30 is crushed and the pressure tube 42 is deformed. This causes a pressure change in the pressure tube 42. One or each of the pressure sensors 44 outputs, to the ECU 46, a signal corresponding to the pressure change in the pressure tube 42. Consequently, the ECU 46 can adequately determine that the collision object is a pedestrian.

On the other hand, in the collision between the bumper cover 50 and the collision object other than a pedestrian, for example, a road obstacle such as a roadside marker or a post cone, the collision object hits the low rigidity part 50A that is a lower part of the bumper cover 50. For this reason, mainly, a collision load F2 (see FIG. 2) acting rearward is applied to the low rigidity part 50A.

Here, the low rigidity part 50A of the bumper cover 50 is disposed at a position lower than the pressure tube 42. That is, in front of the pressure tube 42, a lower end of the high rigidity part 50B having a bending rigidity higher than that of the low rigidity part 50A is disposed instead of the low rigidity part 50A. Thus, when receiving the collision load F2, the low rigidity part 50A of the bumper cover 50 deforms such that the deformation of the upper end of the low rigidity part 50A toward the rear side is reduced, and the lower end of the low rigidity part 50A is mainly displaced rearward (see the low rigidity part 50A indicated by a chain double-dashed line in FIG. 2). That is, the low rigidity part 50A deforms rearward and obliquely upward (in a direction of arrow B in FIG. 2). This reduces pressing of the bumper cover 50 against the pressure tube 42. Thus, the deformation amount of the pressure tube 42 can be reduced. Consequently, the ECU 46 can adequately determine that the collision object colliding with the bumper cover 50 is an object other than a pedestrian. As described above, the collision detection apparatus 10 of the present embodiment can adequately determine the collision object colliding with the vehicle V.

The upper cover part 54U of the inner cover 54 constituting the high rigidity part 50B of the bumper cover 50 includes the reinforcement ribs 54B. The lower cover part 54L of the inner cover 54 constituting the low rigidity part 50A of the bumper cover 50 has the holes 54A. Thus, with a simple configuration, the bumper cover 50 can be provided with the low rigidity part 50A having a relatively low bending rigidity and the high rigidity part 50B having a bending rigidity higher than that of the low rigidity part 50A.

The upper cover part 54U of the inner cover 54 includes, at its upper part, the reinforcement ribs 54B, so that the bending rigidity of the upper part of the high rigidity part 50B is higher than that of the lower part of the high rigidity part 50B. Thus, when the collision load F1 acting rearward and obliquely downward is applied to the upper part of the bumper cover 50, the high rigidity part 50B can be entirely tilted rearward and obliquely downward with the lower part of the high rigidity part 50B as starting point. Consequently, in the collision between the pedestrian and the bumper cover 50, the bumper cover 50 can adequately deform the pressure tube 42.

The bumper cover 50 includes the outer cover 52 and the inner cover 54. The outer cover 52 constitutes a design surface of the vehicle V. The inner cover 54 is disposed rearward from the outer cover 52 and includes the reinforcement ribs 54B and the holes 54A. This can secure, with the outer cover 52, designability of the vehicle V and increase, with the inner cover 54, design flexibility with respect to the bending rigidity of the bumper cover 50.

The high rigidity part 50B of the bumper cover 50 has an upper end at a position higher than the bumper beam 20. Thus, when the collision load F1 acting rearward and obliquely downward is applied to the bumper cover 50, the high rigidity part 50B of the bumper cover 50 can be tilted rearward and obliquely downward from above the absorber 30. This can cause the high rigidity part 50B to adequately press the absorber 30 and the pressure tube 42 to be deformed. Thus, the pressure tube 42 can be deformed while the absorber 30 can adequately absorb the collision load F1.

The lower inclined surface 30B constituting the lower part of the front surface of the absorber 30 is gradually inclined rearward in a downward direction when viewed in the left-right direction, and is disposed at a position below the pressure tube 42 and rearward from the low rigidity part 50A. With this arrangement, the front-rear length L1 between the lower end of the lower inclined surface 30B and the bumper cover 50 can be made longer than the front-rear length L2 between the upper end of the lower inclined surface 30B and the bumper cover 50. As described above, in the collision between the collision object other than a pedestrian and the bumper cover 50, the low rigidity part 50A deforms such that the lower end of the low rigidity part 50A is displaced rearward. Thus, in the collision between the collision object other than the pedestrian and the bumper cover 50, pressing of the bumper cover 50 against the absorber 30 can effectively be reduced. This can effectively reduce application of the collision load F2 to the pressure tube 42 via the absorber 30. Consequently, the collision object colliding with the bumper cover 50 can be determined more adequately.

Figure 3:
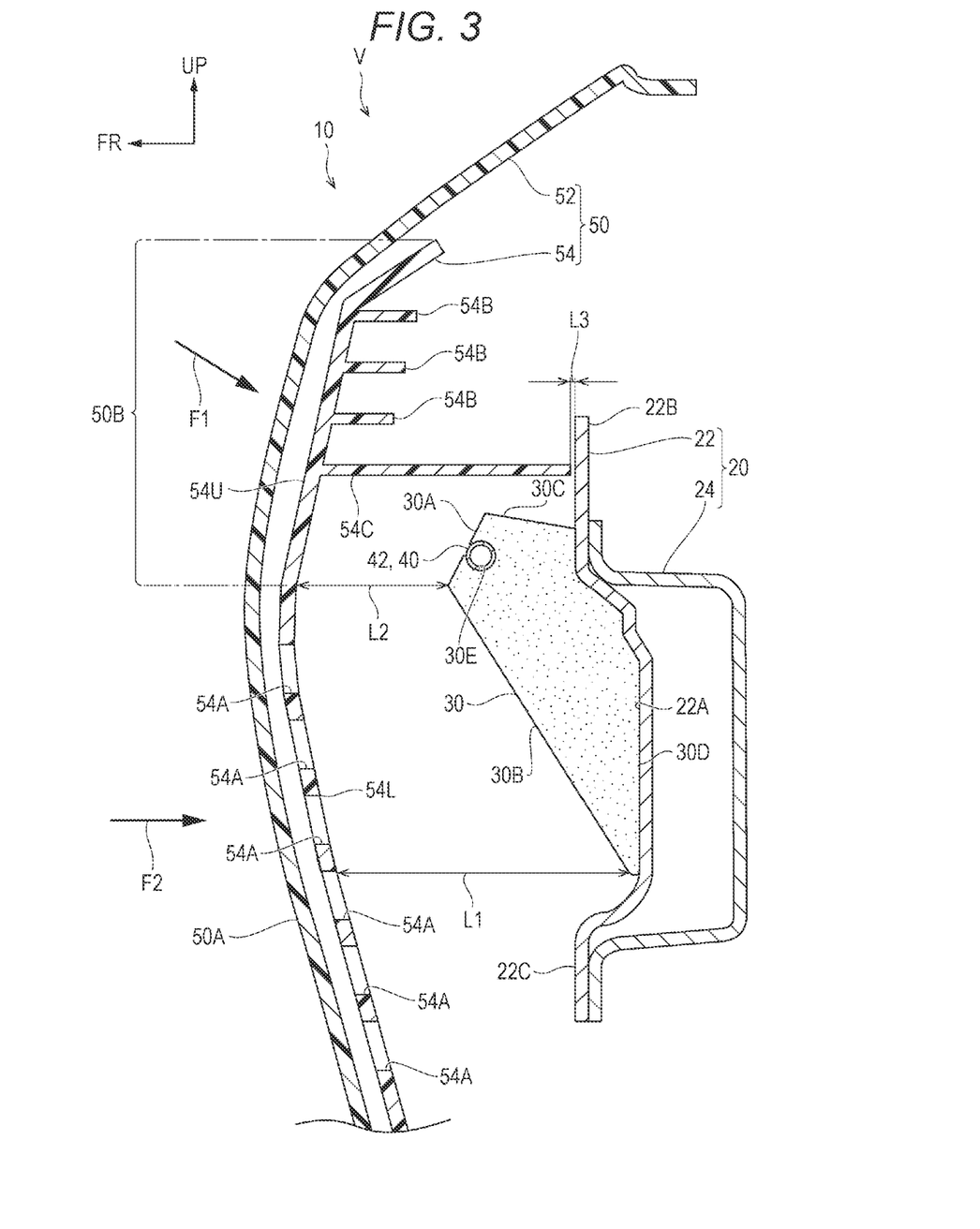
FIG. 3 is a sectional view corresponding to FIG. 2 and illustrating a modification of a bumper cover illustrated in FIG. 2.

With reference to FIG. 3, a modification of the bumper cover 50 will now be described. As illustrated in FIG. 3, in the modification of the bumper cover 50, the inner cover 54 includes an abutment rib 54C as an abutting part instead of the lowermost reinforcement rib 54B. That is, the upper cover part 54U of the inner cover 54 includes three reinforcement ribs 54B and the abutment rib 54C disposed at a position below the three reinforcement ribs 54B. Similarly to each reinforcement rib 54B, the abutment rib 54C has a plate shape whose plate thickness direction corresponds to the up-down direction, and extends in the left-right direction. The abutment rib 54C has a rear part at a position above the absorber 30, and a distal end (rear end) disposed proximate to the front side of the upper flange 22B of the bumper beam 20. In one example, a front-rear length L3 between the abutment rib 54C and the bumper beam 20 is made significantly shorter than the front-rear length L2 between the bumper cover 50 and the front end of the absorber 30.

The bumper cover 50 is set as follows: when a collision load that is equal to or greater than a predetermined value and acts rearward is applied to the bumper cover 50, the bumper cover 50 deforms rearward, so that a tip of the abutment rib 54C abuts on the upper flange 22B of the bumper beam 20 and the abutment rib 54C is broken. In other words, the bumper cover 50 has a configuration as follows: when the collision load that is less than the predetermined value and acts rearward is applied to the bumper cover 50, even if the tip of the abutment rib 54C abuts on the upper flange 22B, the breakage of the abutment rib 54C is prevented and the rearward displacement of the bumper cover 50 is restricted.

In more detail, a break strength of the abutment rib 54C is set such that the abutment rib 54C is bent when the high rigidity part 50B of the bumper cover 50 receives the collision load F1 which is equal to or greater than a predetermined value based on which the collision object colliding with the bumper cover 50 is estimated to be a pedestrian. Thus, also in the modification of the bumper cover 50, in a collision between the pedestrian and the bumper cover 50, the abutment rib 54C is bent and thus the high rigidity part 50B can adequately deform the pressure tube 42. Thus, the collision detection apparatus 10 can adequately detect that the collision body is a pedestrian.

On the other hand, the break strength of the abutment rib 54C is set such that the abutment rib 54C is prevented from being bent when the low rigidity part 50A of the bumper cover 50 receives the collision load F2 that is less than the predetermined value based on which the collision object colliding with the bumper cover 50 is estimated to be an object other than a pedestrian. For this reason, even if the abutment rib 54C abuts on the upper flange 22B in a collision between the collision object other than a pedestrian and the bumper cover 50, the abutment rib 54C is not broken. Thus, the abutment rib 54C restricts the rearward displacement of the bumper cover 50. At this time, the front-rear length L3 between the abutment rib 54C and the bumper beam 20 is made shorter than the front-rear length L2 between the bumper cover 50 and the absorber 30. This can effectively reduce pressing of the bumper cover 50 against the absorber 30 and the pressure tube 42. Thus, also in the modification of the bumper cover 50, the deformation of the pressure tube 42 can be reduced in a collision between a collision object other than a pedestrian and the bumper cover 50. Consequently, the collision detection apparatus 10 can adequately detect that the collision object is an object other than a pedestrian.

In the modification of the bumper cover 50, the abutment rib 54C is disposed at a position below the three reinforcement ribs 54B. Thus, the abutment rib 54C can be disposed in a lower position as compared with a configuration in which the abutment rib 54C is disposed at a position above the reinforcement ribs 54B. That is, the abutment rib 54C can be disposed close to the upper end of the low rigidity part 50A of the bumper cover 50. This can effectively reduce rearward displacement of the upper end of the low rigidity part 50A in a collision between a collision object other than a pedestrian and the bumper cover 50.

Figure 4:
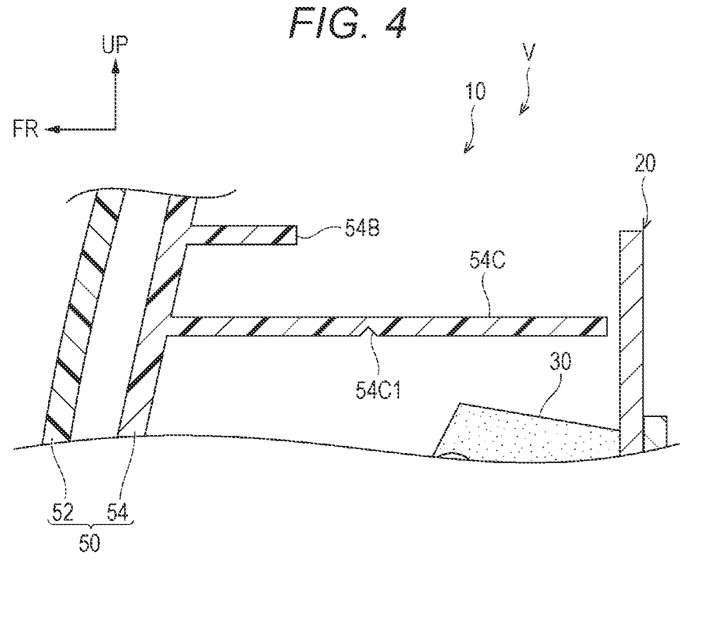
FIG. 4 is a sectional view illustrating a modification of an abutment rib of an inner cover illustrated in FIG. 3.
Figure 5:
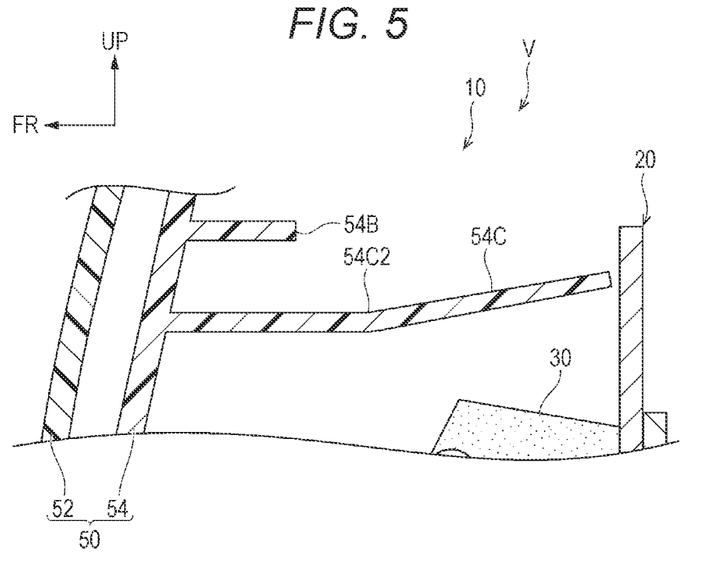
FIG. 5 is a sectional view illustrating another modification of the abutment rib of the inner cover illustrated in FIG. 3.

Note that in the modification of the bumper cover 50, the abutment rib 54C is set such that the abutment rib 54C is bent when the bumper cover 50 receives the collision load that is equal to or greater than the predetermined value and acts rearward. In one example, the abutment rib 54C may have a bending starting point from which the abutment rib 54C is bent. For example, as illustrated in FIG. 4, the abutment rib 54C may have, in its intermediate area in the front-rear direction, a downward open notch 54C1 serving as the bending starting point. The abutment rib 54C may be configured to be bent with the notch 54C1 as the bending starting point when the bumper cover 50 receives the collision load that is equal to or greater than the predetermined value and acts toward the vehicle rear side. Alternatively, as illustrated in FIG. 5, the abutment rib 54C may include, in its intermediate area in the front-rear direction, a bent part 54C2 bent rearward and obliquely upward and serving as the bending starting point. The abutment rib 54C may be configured to be bent with the bent part 54C2 as the bending starting point when the bumper cover 50 receives the collision load that is equal to or greater than the predetermined value and acts toward the vehicle rear side.

In the present embodiment (including the modifications), the upper inclined surface 30A of the absorber 30 has the holding groove 30E, and the pressure tube 42 is held at the front end of the absorber 30. Alternatively, the rear surface 30D of the absorber 30 may have, at its upper end, the holding groove 30E, and the pressure tube 42 may be held at a rear end of the absorber 30.

In the present embodiment (including the modification), the upper cover part 54U of the inner cover 54 includes, at its upper part, the reinforcement ribs 54B to thereby increase the bending rigidity of the upper cover part 54U. However, how to increase the bending rigidity of the upper cover part 54U is not limited thereto. For example, the upper cover part 54U may have an increased plate thickness to increase the bending rigidity of the upper cover part 54U.

The invention claimed is:

1. A collision detection apparatus comprising:
   a bumper beam extending in a vehicle width direction;
   an absorber disposed adjacent to a vehicle front side of the bumper beam;
   a collision detection sensor comprising a pressure tube that extends in the vehicle width direction and is held by the absorber, the collision detection sensor being configured to output a signal corresponding to a pressure change in the pressure tube; and
   a bumper cover disposed on a vehicle front side of the absorber, wherein the bumper cover comprises:
      a low rigidity part disposed at a position lower than the pressure tube; and
      a high rigidity part disposed at a position above the low rigidity part and comprising (i) a bending rigidity higher than a bending rigidity of the low rigidity part, and (ii) an upper end at a position higher than the pressure tube,
   wherein, the bumper beam has a front panel with an upper end of the front panel extending beyond an upmost end of the absorber and a lower end of the front panel extending beyond a lowermost end of the absorber, such that the bumper beam is capable of being abut on the front panel of the bumper beam beyond the upmost end and lowermost end of the absorber under a collision load.

2. The collision detection apparatus according to claim 1, wherein
   the high rigidity part further comprises, on a vehicle upper side of the absorber, an abutting part extending toward a vehicle rear side, and
   the abutting part comprises a distal end to be abut on the bumper beam and acts toward the vehicle rear side, in response to the bumper cover receives the collision load that is equal to or greater than a predetermined value.

3. The collision detection apparatus according to claim 2, wherein
   the abutting part comprises a bending starting point, and
   the abutting part is bent from the bending starting point, in response to the bumper cover receives the collision load equal to or greater than the predetermined value.

4. The collision detection apparatus according to claim 1, wherein the bumper beam further comprises:
   an upper flange and a lower flange on the vehicle front side of the bumper beam in the up-down direction of the vehicle; and
   a recess disposed in an intermediate area of the vehicle front side of the bumper beam in the up-down direction and joining the upper flange and the lower flange, adjacent to a rear surface of the absorber.

5. A collision detection apparatus comprising:
   a bumper beam extending in a vehicle width direction;
   an absorber disposed adjacent to a vehicle front side of the bumper beam;
   a collision detection sensor comprising a pressure tube that extends in the vehicle width direction and is held by the absorber, the collision detection sensor being configured to output a signal corresponding to a pressure change in the pressure tube; and
   a bumper cover disposed on a vehicle front side of the absorber, wherein the bumper cover comprises:
      a low rigidity part disposed at a position lower than the pressure tube; and
      a high rigidity part disposed at a position above the low rigidity part and comprising (i) a bending rigidity higher than a bending rigidity of the low rigidity part, and (ii) an upper end at a position higher than the pressure tube,
   wherein, the high rigidity part further comprises:
      on a vehicle upper side of the absorber, an abutting part extending toward a vehicle rear side, and the abutting part comprises a distal end to be abut on the bumper beam when the bumper cover receives a collision load that is equal to or greater than a predetermined value and acts toward the vehicle rear side; and
      reinforcements elongated toward the vehicle rear side, and
   wherein, the low rigidity part further comprises a plurality of holes penetrating therethrough in a vehicle front-rear direction.

6. The collision detection apparatus according to claim 5, wherein
   the abutting part comprises a bending starting point, and
   the abutting part is bent from the bending starting point when the bumper cover receives the collision load equal to or greater than the predetermined value.

7. The collision detection apparatus according to claim 6, wherein the high rigidity part comprises an upper end disposed on a vehicle upper side, relative to the bumper beam.

8. The collision detection apparatus according to claim 5, wherein the abutting part is disposed on a vehicle lower side, relative to the reinforcements.

9. The collision detection apparatus according to claim 6, wherein the abutting part is disposed on a vehicle lower side, relative to the reinforcements.

10. The collision detection apparatus according to claim 8, wherein
    the reinforcements are disposed at a vehicle upper part of the high rigidity part, and
    the vehicle upper part of the high rigidity part comprises a bending rigidity higher than a bending rigidity of a vehicle lower part of the high rigidity part.

11. The collision detection apparatus according to claim 8, wherein
the bumper cover comprises:
an outer cover constituting a design surface of a vehicle; and
an inner cover disposed on a vehicle rear side of the outer cover, and
the abutting part, the reinforcements, and the holes are formed in the inner cover.

12. The collision detection apparatus according to claim 8, wherein the high rigidity part comprises an upper end disposed on a vehicle upper side, relative to the bumper beam.

13. The collision detection apparatus according to claim 5, wherein
the reinforcements are disposed at a vehicle upper part of the high rigidity part, and
the vehicle upper part of the high rigidity part comprises a bending rigidity higher than a bending rigidity of a vehicle lower part of the high rigidity part.

14. The collision detection apparatus according to claim 5, wherein
the bumper cover comprises:
an outer cover constituting a design surface of a vehicle; and
an inner cover disposed on a vehicle rear side of the outer cover, and
the abutting part, the reinforcements, and the holes are formed in the inner cover.

15. The collision detection apparatus according to claim 5, wherein the high rigidity part comprises an upper end disposed on a vehicle upper side, relative to the bumper beam.

16. A collision detection apparatus comprising:
a bumper beam extending in a vehicle width direction;
an absorber disposed adjacent to a vehicle front side of the bumper beam;
a collision detection sensor comprising a pressure tube that extends in the vehicle width direction and is held by the absorber, the collision detection sensor being configured to output a signal corresponding to a pressure change in the pressure tube; and
a bumper cover disposed on a vehicle front side of the absorber, wherein the bumper cover comprises:
a low rigidity part disposed at a position lower than the pressure tube; and
a high rigidity part disposed at a position above the low rigidity part and comprising (i) a bending rigidity higher than a bending rigidity of the low rigidity part, and (ii) an upper end at a position higher than the pressure tube,
the absorber comprises an inclined surface on a front surface of the absorber, and
the inclined surface is inclined to a vehicle rear side toward a vehicle lower side when viewed in the vehicle width direction, and is disposed on a vehicle lower side of the pressure tube and on the vehicle rear side of the low rigidity part.

17. The collision detection apparatus according to claim 16, wherein
the high rigidity part further comprises, on a vehicle upper side of the absorber, an abutting part extending toward a vehicle rear side, and
the abutting part comprises a distal end to be abut on the bumper beam when the bumper cover receives a collision load that is equal to or greater than a predetermined value and acts toward the vehicle rear side.

18. The collision detection apparatus according to claim 17, wherein
the abutting part comprises a bending starting point, and
the abutting part is bent from the bending starting point when the bumper cover receives the collision load equal to or greater than the predetermined value.

* * * * *